(12) United States Patent
Hofmann et al.

(10) Patent No.: US 9,975,456 B2
(45) Date of Patent: May 22, 2018

(54) VEHICLE SEAT WITH FREE-PIVOTING FUNCTION

(75) Inventors: Jochen Hofmann, Marktgraitz (DE); Marcus Alex, Coburg (DE); Marco Gleißberg, Coburg (DE)

(73) Assignee: Brose Fahrzeugteile GMBH & Co. Kommanditgesellschaft, Coburg, Coburg (DE)

( * ) Notice: Subject to any disclaimer, the term of this patent is extended or adjusted under 35 U.S.C. 154(b) by 1362 days.

(21) Appl. No.: 13/472,357

(22) Filed: May 15, 2012

(65) Prior Publication Data

US 2012/0292972 A1    Nov. 22, 2012

(30) Foreign Application Priority Data

May 16, 2011    (DE) .................... 10 2011 075 939

(51) Int. Cl.
  *B60N 2/235*    (2006.01)
  *B60N 2/20*    (2006.01)

(52) U.S. Cl.
  CPC ............ *B60N 2/2352* (2013.01); *B60N 2/20* (2013.01); *B60N 2/2356* (2013.01); *B60N 2205/50* (2013.01)

(58) Field of Classification Search
  None
  See application file for complete search history.

(56) References Cited

U.S. PATENT DOCUMENTS

| | | | |
|---|---|---|---|
| 4,335,919 A | 6/1982 | Nagashima et al. | |
| 5,324,071 A * | 6/1994 | Gotomyo et al. | 280/730.1 |
| 5,466,001 A * | 11/1995 | Gotomyo et al. | 280/730.1 |
| 8,109,573 B2 | 2/2012 | Kienke et al. | |
| 2004/0130442 A1 * | 7/2004 | Breed et al. | 340/443 |
| 2010/0060064 A1 * | 3/2010 | Kienke et al. | 297/361.1 |

(Continued)

FOREIGN PATENT DOCUMENTS

| | | |
|---|---|---|
| CN | 1792669 A | 6/2006 |
| CN | 101407188 A | 4/2009 |
| CN | 101573251 A | 11/2009 |

(Continued)

OTHER PUBLICATIONS

Chinese examination report for Application No. 201210152978.0, dated Mar. 26, 2014, 7 sheets.

*Primary Examiner* — David E Allred
(74) *Attorney, Agent, or Firm* — Lewis Roca Rothgerber Christie LLP (57) ABSTRACT

A vehicle seat with a seat part, a backrest and a fitting which pivotally connects the backrest with the seat part. The fitting includes a backrest-side fitting part coupled with the backrest via a locking mechanism, and a rotary fitting mechanism. A driving device is arranged on the backrest for driving the rotary fitting mechanism. In a locking position, the locking mechanism firmly couples the backrest-side fitting part with the backrest, and in a free-pivoting position decouples the backrest-side fitting part from the backrest, so that the backrest is pivotable into a folded position in a swivel direction about the swivel axis. The driving device is formed to actuate the rotary fitting mechanism for pivoting the backrest-side fitting part by a predetermined angle against the swivel direction, when the locking mechanism is actuated for pivoting the backrest into the folded position.

10 Claims, 6 Drawing Sheets

(56) References Cited

U.S. PATENT DOCUMENTS

2011/0154925 A1    6/2011  Siller et al.
2012/0089299 A1*  4/2012  Breed ............................ 701/36

FOREIGN PATENT DOCUMENTS

| DE | 30 07 811 A1 | 9/1980 |
| --- | --- | --- |
| DE | 10 2007 042 604 A1 | 5/2008 |
| DE | 10 2008 028 088 A1 | 12/2009 |
| DE | 10 2008 028 094 A1 | 12/2009 |
| DE | 10 2008 028 101 A1 | 12/2009 |
| DE | 10 2004 061 960 B4 | 10/2010 |
| JP | 2009-51233 A | 3/2009 |
| WO | WO 2010/067916 A1 | 6/2010 |

* cited by examiner

VEHICLE SEAT WITH FREE-PIVOTING FUNCTION

CROSS-REFERENCE TO RELATED APPLICATION

This application claims priority to and the benefit of German Patent Application No. 10 2011 075 939.5 filed on May 16, 2011 and is fully incorporated herein by reference.

DESCRIPTION

This invention relates to a vehicle seat according to the generic part of claim 1 and to a method for forward-pivoting a backrest of a vehicle seat.

Such vehicle seat comprises a seat part, a backrest and a fitting which pivotally connects the backrest with the seat part about a swivel axis. The fitting includes a seat-part-side fitting part firmly connected with the seat part and a backrest-side fitting part coupled with the backrest via a locking mechanism. The seat-part-side fitting part and the backrest-side fitting part are connected with each other via a rotary fitting mechanism such that the seat-part-side fitting part and the backrest-side fitting part can be pivoted relative to each other about the swivel axis.

To drive the rotary fitting mechanism, a preferably electromotively acting driving device is arranged at the backrest. When the backrest is to be pivoted in its tilt position relative to the seat part, the driving device will drive the rotary fitting mechanism, so as to shift the backrest-side fitting part relative to the seat-part-side fitting part of the fitting and pivot the backrest to the seat part. To limit the swivel path of the seat-part-side fitting part and the backrest-side fitting part, at least one seat-part-side stop and at least one backrest-side stop are provided, which upon actuation of the rotary fitting mechanism can come in abutment with each other, so as to limit the swivel path to the front and to the rear when the backrest inclination is adjusted via the driving device.

The adjustment of the inclination of the backrest relative to the seat part is effected by actuating the driving device and driving the rotary fitting mechanism for pivoting the backrest-side fitting part relative to the seat-part-side fitting part. During a normal adjustment of the backrest inclination, the backrest-side fitting part is firmly coupled with the backrest via the locking mechanism. For this purpose, the locking mechanism is in a locking position, so that when pivoting the backrest-side fitting part by driving the rotary fitting mechanism, the backrest is pivoted about the swivel axis together with the backrest-side fitting part.

The locking mechanism can, however, be actuated to decouple the backrest-side fitting part from the backrest, in order to be able to freely pivot the backrest manually and without actuating the driving device (so-called free-pivoting function). Such free pivoting of the backrest can be provided, in order to pivot the backrest forward into a folded position in a swivel direction in connection with a so-called easy-entry function for providing an access to a rear seat located behind the vehicle seat, or to fold the backrest into a horizontal position in connection for example with a table function. For this purpose, the locking mechanism can be actuated for unlocking the backrest-side fitting part from the backrest, so that in a free-pivoting position the locking mechanism decouples the backrest-side fitting part from the backrest.

In such a vehicle seat arrangement, the driving device fixed at the backrest is moved along with the backrest during forward-pivoting of the backrest in connection with a free-pivoting function. Forward-pivoting of the backrest in principle is effected independent of the fitting with its seat-part-side fitting part and its backrest-side fitting part decoupled from the backrest by means of the locking mechanism. Due to the fact, however, that the driving device is moved together with the backrest during forward-pivoting of the backrest, the driving device also moves relative to the rotary fitting mechanism of the fitting, so that due to the movement of the driving device during forward-pivoting the rotary fitting mechanism also is shifted by a certain distance (the driving device for example can act on a shaft which is coupled with the rotary fitting mechanism; when the driving device is pivoted during forward-pivoting, the shaft will pivot with the driving device in particular with a self-locking design of the driving device, so that the rotary fitting mechanism is driven thereby).

The fact that the rotary fitting mechanism is shifted by a small distance during forward-pivoting of the backrest and hence also of the driving device in connection with the free-pivoting function, and the backrest-side fitting part thereby is moved by a small distance relative to the seat-part-side fitting part, is unproblematic as such. During backward-pivoting of the backrest, this shifting movement of the rotary fitting mechanism is reversed again and the backrest-side fitting part thus is moved back into its starting position, so that the operation of the fitting and the position of the seat with the backrest erected again is not impaired.

When the backrest-side fitting part, however, is in a position relative to the seat-part-side fitting part in which a backrest-side stop for limiting the swivel path to the front has approached a seat-part-side stop or even is in abutment with the seat-part-side stop, the actuation of the rotary fitting mechanism during forward-pivoting of the backrest in connection with the free-pivoting function can lead to a distortion of the fitting by the backrest-side stop being pressed against the seat-part-side stop during forward-pivoting of the backrest. This can lead to the fact that the backrest cannot be pivoted forward into its folded position, because this is prevented by the stops being in abutment, or the rotary fitting mechanism or other components of the fitting even are damaged by the forces exerted on the backrest, in particular when components (e.g. gear wheels) of the rotary fitting mechanism are formed of plastics.

In a vehicle seat known from DE 10 2004 061 960 B4, this problem is overcome in that on a shaft via which the driving device drives the rotary fitting mechanism a rotary encoder is arranged for detecting the angular position of the backrest-side fitting part and the seat-part-side fitting part relative to each other. The rotary encoder determines two angular end positions of the fitting parts, during overshoot of which the driving device is switched off and in which on folding the backrest in connection with a free-pivoting function a sufficient residual swivel angle is available for the fitting parts, without the stops limiting the swivel path to the front being able to run up onto each other during forward-pivoting of the backrest in connection with the free-pivoting function into the position folded forward. By means of the rotary encoder, stopping of the driving device thus is effected in the case of a normal setting of the inclination of the backrest via the driving device, before the stops are moved towards each other too much during forward-pivoting of the backrest. Due to the stopping of the driving device effected for example via a microswitch of the rotary encoder, it is achieved that in the case of a normal setting of the backrest inclination the stops always have a sufficient distance to each other, so that during forward-pivoting of the backrest in connection with a free-pivoting function a sufficient residual swivel path always is available for the backrest-side fitting part and during forward-pivoting of the backrest in connection with the free-pivoting function the backrest-side stop cannot run up onto the seat-part-side stop.

A disadvantage of the arrangement according to DE 10 2004 061 960 B4 consists in that additional components, in particular an additional rotary encoder and additional microswitches are required, which can influence the manufacturing costs for a fitting arrangement quite considerably. The rotary encoder of DE 10 2004 061 960 B4 is formed by a spindle attachment and a spindle nut, wherein on rotating the shaft the spindle nut is rolling on the spindle attachment and thereby is longitudinally shifted relative to the spindle attachment, so that in dependence on the position of the spindle nut a microswitch is actuated. To ensure that the rotary encoder triggers the microswitch in the desired way, a precise setting and adjustment of the rotary encoder is required, which complicates the manufacture and assembly of the rotary encoder and further increases the costs of the fitting arrangement.

It is the object of the present invention to provide a vehicle seat and a method for forward-pivoting a backrest of vehicle seat, in which with simple constructive means a distortion due to stops running up onto each other during forward-pivoting of the backrest in connection with a free-pivoting function is prevented.

This object is solved by a subject-matter with the features of claim 1.

Accordingly, it is provided in a vehicle seat as described above that the driving device is formed to move the rotary fitting mechanism for pivoting the backrest-side fitting part by a predetermined angle against (i.e., opposite to) the swivel direction, when the locking mechanism is actuated for pivoting the backrest into the folded position.

The present invention proceeds from the idea to set the backrest-side fitting part back by a predetermined angle in an automatically controlled way (i.e. move the same against the swivel direction corresponding to a pivoting), when the locking mechanism is actuated for unlocking the backrest from the backrest-side fitting part and the backrest hence is decoupled from the backrest-side fitting part. By resetting the backrest-side fitting part it is achieved that the backrest-side stop and the seat-part side stop, which limit the swivel path of the backrest-side fitting part relative to the seat-part-side fitting part on pivoting into the swivel direction, are moved away from each other. As a result, a swivel path is provided between the backrest-side fitting part and the seat-part-side fitting part, by which the backrest-side fitting part can be pivoted to the seat-part-side fitting part during forward-pivoting of the backrest in connection with a free-pivoting function, without the associated stops being able to run up onto each other.

In other words, driven by the driving device, the rotary fitting mechanism is shifted by a (small) angle for resetting the backrest-side fitting part relative to the seat-part-side fitting part. The angle advantageously is greater than the angle by which the backrest-side fitting part is moved on pivoting the backrest in connection with the free-pivoting function. For example, when a handle arranged at the backrest is actuated for folding the backrest for instance in connection with an easy-entry function and the locking mechanism thus is unlocked for decoupling the backrest from the seat-part-side fitting part, the driving device will briefly drive the rotary fitting mechanism, so that the backrest-side fitting part is reset, so that on forward-pivoting of the backrest running up of the stops also is prevented when in the starting position of the backrest on forward-pivoting the stops rest against each other or at least are approached closed to each other.

The present invention advantageously is usable for providing a free-pivoting function for free forward-pivoting in connection with an easy-entry function. In this case, the folded position corresponds to a position folded forwards. It is also possible, however, to use the invention in connection with a free-pivoting function for freely folding back a backrest, for instance for a reclined position of the vehicle seat. In this case, the folded position corresponds to the reclined position with flat backrest.

In the following, the invention will chiefly be explained with regard to a free-pivoting function for a free forward-pivoting of the backrest, wherein the explained configurations and advantages, however, likewise are applicable to the case of a free-pivoting function for free backward-pivoting.

In the sense of the present invention, running up of the stops on pivoting the backrest in connection with a free-pivoting function solely is prevented by control means. Additional components, such as a rotary encoder or other constructive measures, are not required. In principle, the construction of the fitting is not changed. There is merely required a correspondingly formed control device for actuating the driving device.

The driving device advantageously acts on a shaft, in order to drive the rotary fitting mechanism by rotating the shaft. Fittings arranged on both sides of the backrest can be connected by the shaft, in order to synchronously drive rotary fitting mechanisms of the fittings for shifting the backrest relative to the seat part. The driving device preferably is formed with a self-locking transmission and coupled with the shaft via the self-locking transmission.

The locking mechanism for example can include a pawl stationarily, but e.g. pivotally or shiftably arranged at the backrest, which in the locking position is in locking engagement with the backrest-side fitting part via a toothing, so that the backrest is firmly coupled with the backrest-side fitting part and together with the backrest-side fitting part can be pivoted for adjusting the inclination of the backrest by driving the rotary fitting mechanism. In connection with the free-pivoting function, the pawl can be brought into a free-pivoting position in which it is not in engagement with the backrest-side fitting part, so that the coupling of the backrest-side fitting part with the backrest is eliminated.

The driving device is formed to actuate the rotary fitting mechanism for pivoting the backrest-side fitting part by a predetermined angle against the swivel direction, when the locking mechanism is actuated for pivoting the backrest into the folded position. The driving device thus moves the backrest-side fitting part back by the predetermined angle, when the backrest is to be folded in connection with the free-pivoting function. To effect that the backrest again reaches its starting position from which it has been folded, when the backrest subsequently is erected from its folded position, it can be provided in an advantageous aspect to move the rotary fitting mechanism by the predetermined angle in the swivel direction and hence return it into the starting position, when the backrest is erected from its folded position against the swivel direction. On erecting the backrest, the rotary fitting mechanism thus moves the backrest-side fitting part by the predetermined angle and thus back into its starting position, in which the backrest-side fitting part has been on actuation of the locking mechanism for pivoting the backrest into the folded position.

In principle, such resetting of the first fitting part by actuating the rotary fitting mechanism by the predetermined angle in swivel direction when erecting the backrest can also be omitted. In this case, after again erecting the backrest, the backrest-side fitting part is in another, slightly pivoted position (corresponding to the predetermined angle, by which the backrest-side fitting part has been pivoted against the swivel direction). This can be accepted, however, because the predetermined angle by which the backrest-side fitting part has been pivoted against the swivel direction is small, for example in the order of 1° or 2°, so that the slightly different position of the backrest is hardly noticeable for a seat occupant.

Advantageously, shifting of the rotary fitting mechanism is blocked, when the backrest is in the folded position. This is based on the idea that actuating the rotary fitting mechanism in direction of a rear position of the backrest-side fitting part is to be prevented, when the backrest has been folded forwards, e.g. in connection with an easy-entry function. If actuating the rotary fitting mechanism was possible, it would be conceivable that by actuating the rotary fitting mechanism the backrest-side fitting part would be pivoted to the rear into a position in which it abuts with a rear stop (which limits the swivel path of the backrest-side fitting part to the rear and correspondingly defines a rear backrest position). In this case, when the backrest is erected again (when the driving device also is carried along with the backrest and the rotary fitting mechanism thereby is shifted), the backrest-side fitting part would be pivoted due to the backward-pivoting movement of the backrest, so that the backrest-side fitting would run up onto the rear seat-part-mounted stop and as a result a distortion of the fitting would occur with the risk of a destruction of components of the fitting. This is prevented by the fact that with folded backrest a user-initiated shifting of the rotary fitting mechanism is inhibited, so that with folded backrest, the backrest-side fitting part with the backrest-side stop cannot be approached to rear seat-part-side stop.

The rotary fitting mechanism for example is formed by a reduction gear in the form of a wobble transmission or a planetary transmission. Types of construction of such reduction gears are known for example from DE 10 2008 028 088 A1, DE 10 2008 028 094 A1 or DE 10 2008 028 101 A1, whose contents should be included herein by reference. The reduction gear for example can have a gear reduction with a reduction ratio of 1:35, so that a rotation of the (drive) shaft connected with the rotary fitting mechanism by an angle of 35° effects shifting of the backrest-side fitting part by 1°. If on pivoting the backrest in connection with a free-pivoting function and hence also the driving device firmly connected with the backrest correspondingly is swiveled by 35° and the shaft correspondingly is moved as well, the backrest-side fitting part correspondingly is moved by 1° due to such pivoting.

To prevent the backrest-side stop from running up onto the seat-part-side stop due to this small angular movement of the backrest-side fitting part, the rotary fitting mechanism for pivoting the backrest-side fitting part is actuated by a predetermined angle against the swivel direction of the backrest, when the backrest is folded in the sense of the present invention, wherein the following preferably applies for the predetermined angle:

$$\gamma > \delta \cdot \frac{I}{1-I},$$

wherein γ is the predetermined angle, δ is the swivel angle of the backrest on pivoting from a front backrest position into the folded position, and I is a reduction ratio of the rotary fitting mechanism. The front backrest position corresponds to the position of the backrest in which the backrest driven by the driving device is maximally pivoted forwards and in which the stops limiting the swivel path to the front are approached towards each other. With reference to this calculation rule, the predetermined angle for example is 1°, when the swivel angle covered by the backrest on pivoting in connection with the free-pivoting function from the front backrest position is 35° and the reduction ratio is 1:36.

The rotary fitting mechanism can of course also have a different reduction ratio, and correspondingly the predetermined angle can be chosen differently.

Preferably, the predetermined angle will be chosen slightly larger and for this purpose be multiplied by a correction factor greater than 1, in order to additionally exclude the influence of possible deviations within the scope of tolerances.

In a vehicle seat of simple construction, moving the backrest-side fitting part by the predetermined angle against the swivel direction can be provided with each actuation of an operating handle for folding the backrest, independent of the starting position of the backrest and thus independent of whether the risk of the backrest-side stop running up onto the seat-part-side stop really exists. In a development of a vehicle seat it can, however, also be provided that moving the backrest-side fitting part on actuation of the locking mechanism for pivoting the backrest only is provided when the stops are in such a position relative to each other that the risk of running up on pivoting the backrest possibly exists. This can be taken into account when the position of the backrest can be measured by a suitable tilt detection means for detecting the tilt position of the backrest and thus the tilt position of the backrest is known at any time. When the locking mechanism for pivoting the backrest into the folded position is actuated and thus the free-pivoting function is activated, it can then be checked in this case whether the backrest-side stop is in an approached position in the seat-part-side stop and the risk of running up on pivoting the backrest exists. If this is the case, the backrest-side fitting part will be moved by the predetermined angle against the swivel direction, when the locking mechanism is actuated for pivoting the backrest. If this is not the case, the backrest-side fitting part will not be moved on pivoting the backrest.

Alternatively, it can also be provided that when the tilt position of the backrest has been measured by a tilt detection means and thus is known, the rotary fitting mechanism is actuated such that the rotary fitting mechanism is stopped at a normal tilt setting driven by the driving device, before the at least one backrest-side stop is spaced from the at least one seat-part-side stop by less than the predetermined angle. With a tilt setting of the backrest in normal use (i.e. not in connection with the free-pivoting function) the rotary fitting mechanism thus already is actuated such that an excessive approach of the backrest-side stop to the seat-part-side stop is excluded. Within the scope of a normal tilt setting, the backrest-side stop thus can only moved towards the seat-part-side stop to such an extent that the distance between the backrest-side stop and the seat-part-side stop still at least corresponds to the predetermined angle.

Even if a tilt detection means is present, the tilt position of the backrest possibly may not be known in any case, for example because the tilt detection means is denormalized and thus the tilt position cannot be predicted precisely. In this case it is provided that when the tilt position of the backrest is not known, the rotary fitting mechanism for pivoting the backrest-side fitting part is actuated by the predetermined angle against the swivel direction, when the locking mechanism is actuated for pivoting the backrest into the folded position. Thus, when the tilt position of the backrest is not known at the moment, the backrest-side fitting part is moved by the predetermined angle against the swivel direction with each folding of the backrest in connection with the free-pivoting function, so that in each case running up of the backrest-side stop onto the seat-part-side stop is excluded when pivoting the backrest.

The invention also is solved by a method for forward-pivoting a backrest of a vehicle seat. Advantageous aspects are set forth in the succeeding sub-claims, wherein the advantages described above in detail and the exemplary configurations correspondingly are applied for the method.

The idea underlying the invention will be explained in detail below with reference to the exemplary embodiments illustrated in the Figures, in which.

Figure 1:
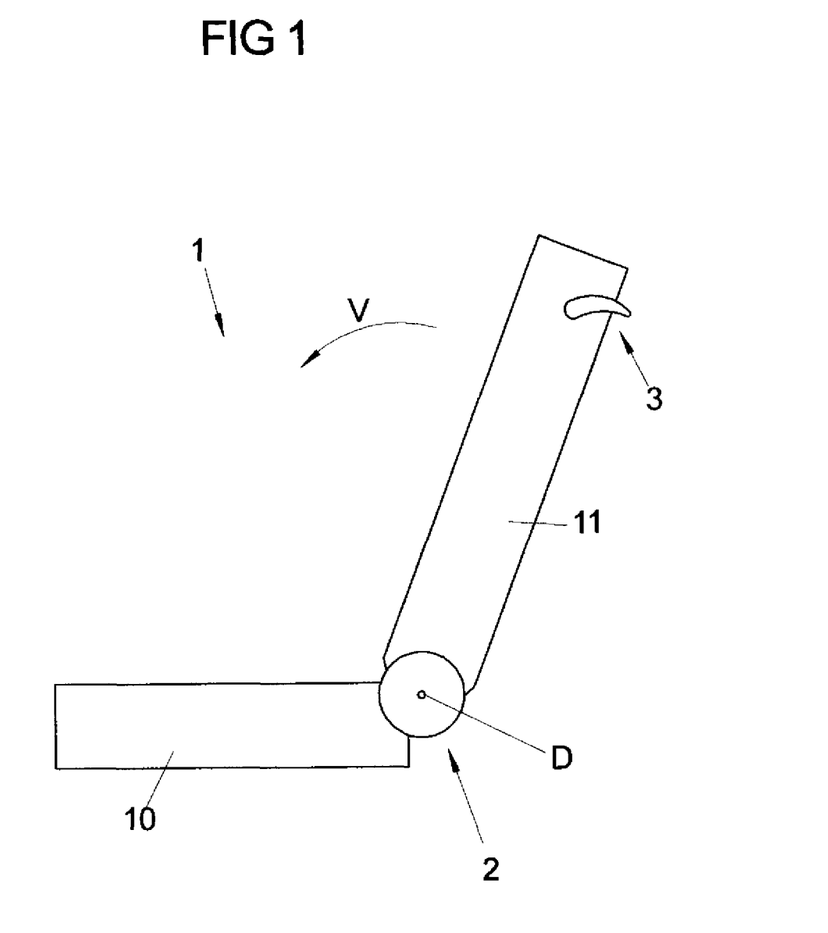
FIG. 1 shows a schematic side view of a vehicle seat.

FIG. 1 shows a schematic side view of a vehicle seat 1 with a backrest 11, which is pivotally connected with a seat part 10 about a swivel axis D via a fitting 2.

Figure 3:
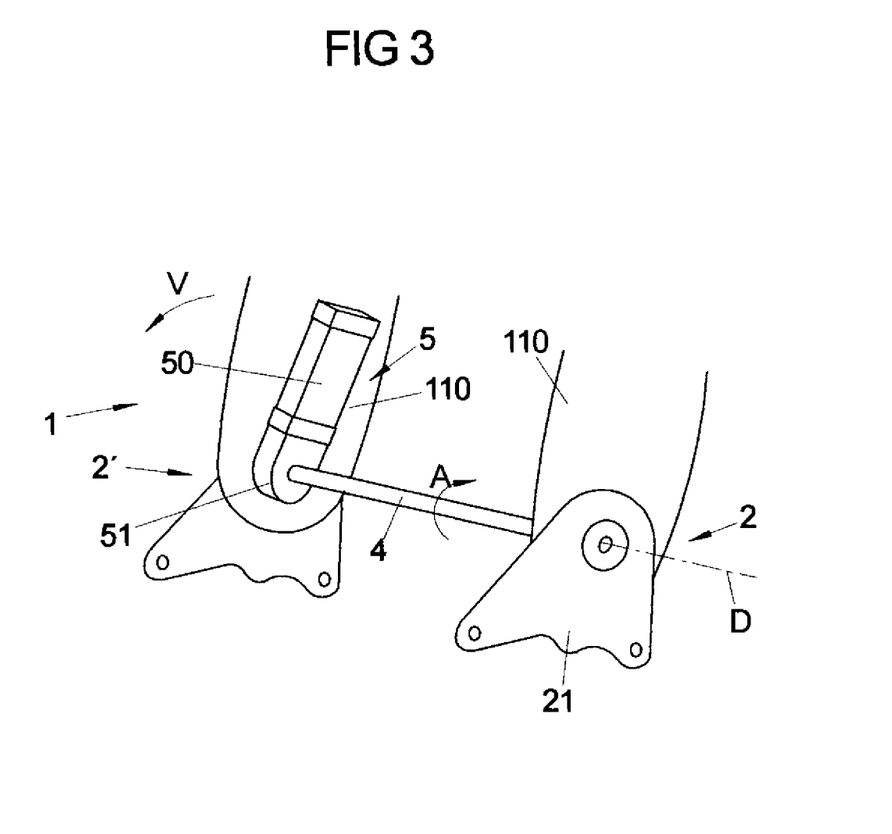
FIG. 3 shows a schematic view of a backrest frame of a backrest to be connected with a seat part via two fittings.

An identically constructed fitting 2, 2' (see FIG. 3) here can be arranged in a manner known per se on both sides of the backrest 11, i.e. on a side located on the tunnel side towards the center of the vehicle and on a side of the backrest 11 located on the door side towards the outside, wherein the fittings 2, 2' are connected with each other via a shaft 4 and can synchronously be actuated via the shaft 4 for adjusting the inclination of the backrest 11.

Figure 2:
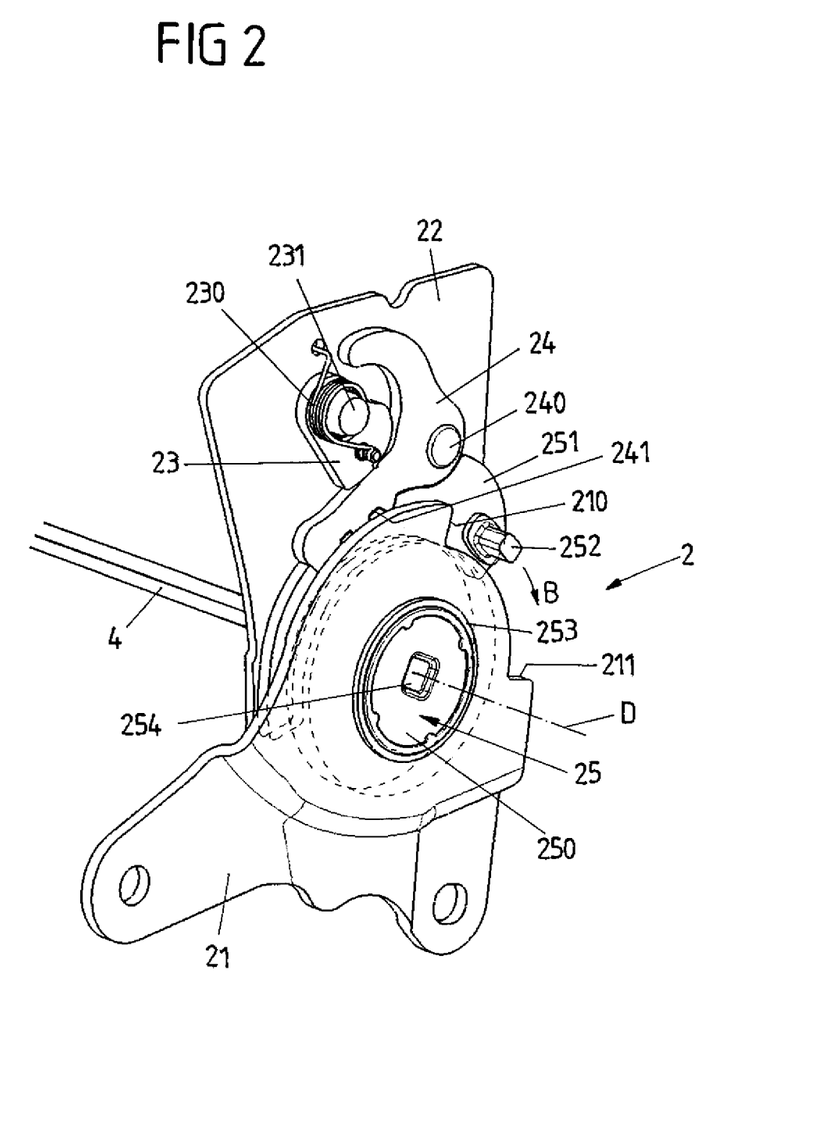
FIG. 2 shows a perspective view of a fitting of a vehicle seat.

A perspective detail view of such fitting 2 is shown in FIG. 2. The fitting 2 includes a seat-part-mounted fitting adapter 21, which is connected with the seat part 10, and a backrest-mounted fitting adapter 22, which is connected with the backrest 11, more exactly with a backrest frame 110 of the backrest 11 (see FIG. 3). The seat-part-mounted fitting adapter 21 and the backrest-mounted fitting adapter 22 are pivotally connected with each other via a rotary fitting mechanism 25 about the swivel axis D, wherein a locking mechanism in the form of a pawl 24 additionally is provided, via which the coupling of the backrest-mounted fitting adapter 22 with the rotary fitting mechanism 25 can be released.

The rotary fitting mechanism 25 is designed in the manner of a wobble or eccentric gear, as it is known for example from DE 10 2008 028 088 A1, DE 10 2008 028 094 A1 or DE 10 2008 028 101 A1. The rotary fitting mechanism 25 includes a seat-part-side fitting part 253 firmly connected with the seat-part-side fitting adapter 21 and a backrest-side fitting part 251 coupled with the backrest-mounted fitting adapter 22 via the locking mechanism in the form of the pawl 24. The seat-part-side fitting part 253 includes an external toothing (not visible in FIG. 2), which is meshingly arranged on an internal toothing (likewise not visible in FIG. 2) of the backrest-side fitting part 251 formed in the manner of an internal gear, wherein the seat-part-side fitting part 253 can eccentrically revolve on the internal toothing of the backrest-side fitting part 251. In a cylindrical receptacle of the seat-part-side fitting part 253 an actuating member 250 is arranged, which includes an engagement opening 254 eccentric to the seat-part-side fitting part 253 and concentric to the backrest-side fitting part 251, via which the shaft 4 is coupled with the actuating member 250.

For actuating the rotary fitting mechanism 25, the actuating member 250 is rotated about the swivel axis D by driving the shaft 4, so that the backrest-side fitting part 251 is moved eccentrically with respect to the seat-part-side fitting part 253 and the backrest-side fitting part 251 thereby is pivoted about the swivel axis D relative to the seat-part-side fitting part 253.

When the locking mechanism in the form of the pawl 24 is in a locking position, in which the pawl 24 stationarily, but pivotally arranged on the backrest-mounted fitting adapter 22 via an axle stub 240 is in locking engagement with the backrest-side fitting part 251 via a toothing 241, the backrest-mounted fitting adapter 22 is firmly coupled with the backrest-side fitting part 251, so that in the case of a pivoting movement of the backrest-side fitting part 251 due to a rotary movement of the rotary fitting mechanism 25, the backrest-mounted fitting adapter 22 and thereby also the backrest 11 is pivoted about the swivel axis D. The tilt position of the backrest 11 thereby can be adjusted in an electromotively driven manner, wherein for this purpose a driving device 5 (see FIG. 3) is provided, which is firmly arranged on the backrest 11 and includes an electric motor 50 and a transmission 51 coupled with the shaft 4 and acting on the shaft 4 for putting the shaft 4 into a rotary movement.

On the backrest-side fitting part 251 a stop 252 is formed in the form of a protruding trunnion which engages in a contour of the seat-part-mounted fitting adapter 21 formed on the seat-part-mounted fitting adapter and offset radially to the inside with respect to the swivel axis D, which on both sides is limited in circumferential direction about the swivel axis D by stops 210, 211 for limiting the swivel path of the backrest-side fitting part 251 to the seat-part-side fitting part 253.

The locking mechanism in the form of the pawl 24 serves to decouple the backrest-side fitting part 251 from the backrest-mounted fitting adapter 22 for providing a free-pivoting function. For actuating the pawl 24, a friction thumb 23 pivotable about a trunnion 231 is arranged on the backrest-mounted fitting adapter 22 which can be actuated via an operating handle 3 (see FIG. 1) at the upper end of the backrest 11 and is biased via a spring 230 in direction of the locking position of the pawl 24 as shown in FIG. 2.

For actuating the pawl 24 in an unlocking direction, the friction thumb 23 acts on the locking pawl 24 and lifts the same with its toothing 241 from its locking engagement with the backrest-side fitting part 251, so that the backrest-side fitting part 251 is decoupled from the backrest-mounted fitting adapter 22 and the backrest-mounted fitting adapter 22 together with the backrest 11 can freely be pivoted to the backrest-side fitting part 251.

The free-pivoting function serves to fold the backrest 11 forwards in the swivel direction V (see FIG. 1 and FIG. 3), in order to allow for example a passenger to have access to a rear seat located behind the vehicle seat 1 or to move the backrest 11 into a horizontal, folded position, in order to provide a table, for example.

When the backrest 11 is pivoted forwards in connection with the free-pivoting function and for this purpose the locking mechanism in the form of the pawl 24 is actuated for decoupling the backrest-mounted fitting adapter 22 from the backrest-side fitting part 251, the driving device 5 (which is firmly connected with the backrest frame 110 of the backrest 11) is moved together with the backrest 11 and pivoted about the swivel axis D. The driving device 5 preferably is of the self-locking type, so that when the driving device 5 is pivoted due to the coupling engagement of the transmission 51 with the shaft 4, the shaft 4 also is moved in the swivel direction V and the rotary fitting mechanism 25 thereby is driven. The result is that on forward-pivoting of the backrest 11 in swivel direction V in connection with the free-pivoting function, the rotary fitting mechanism 25 is actuated, so that the backrest-side fitting part 251 likewise is moved in the swivel direction V.

Because the rotary fitting mechanism 25 forms a reduction gear, the movement of the backrest-side fitting part 251 as compared to the swivel movement of the backrest 11, however, is effected in a manner geared down, so that on forward-pivoting of the backrest 11 by an angle of 35°, for example, and with a reduction ratio of 1:35 the backrest-side fitting part 251 is moved by an angle of 1°.

Figure 4:
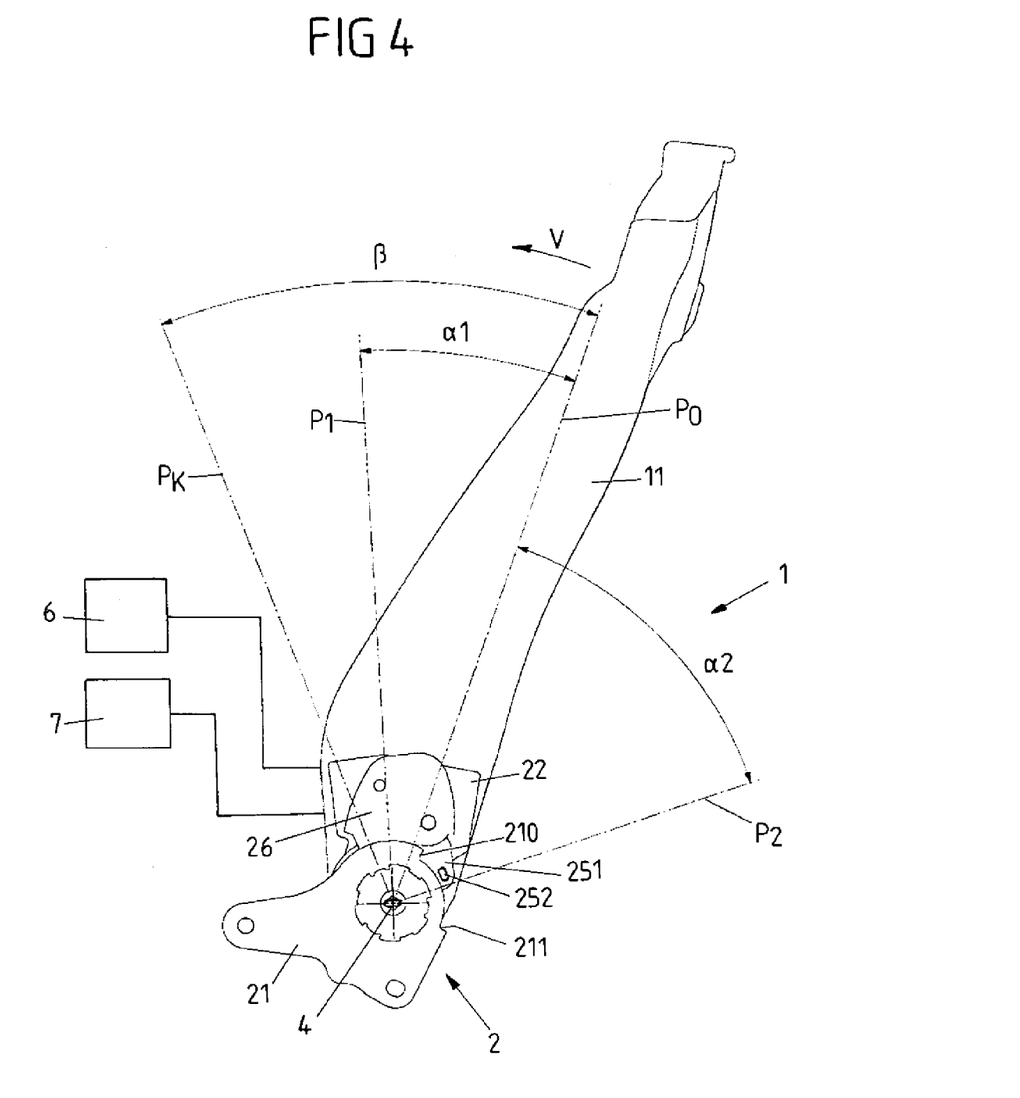
FIG. 4 shows a side view of a backrest, representing different positions of the backrest.
Figure 5:
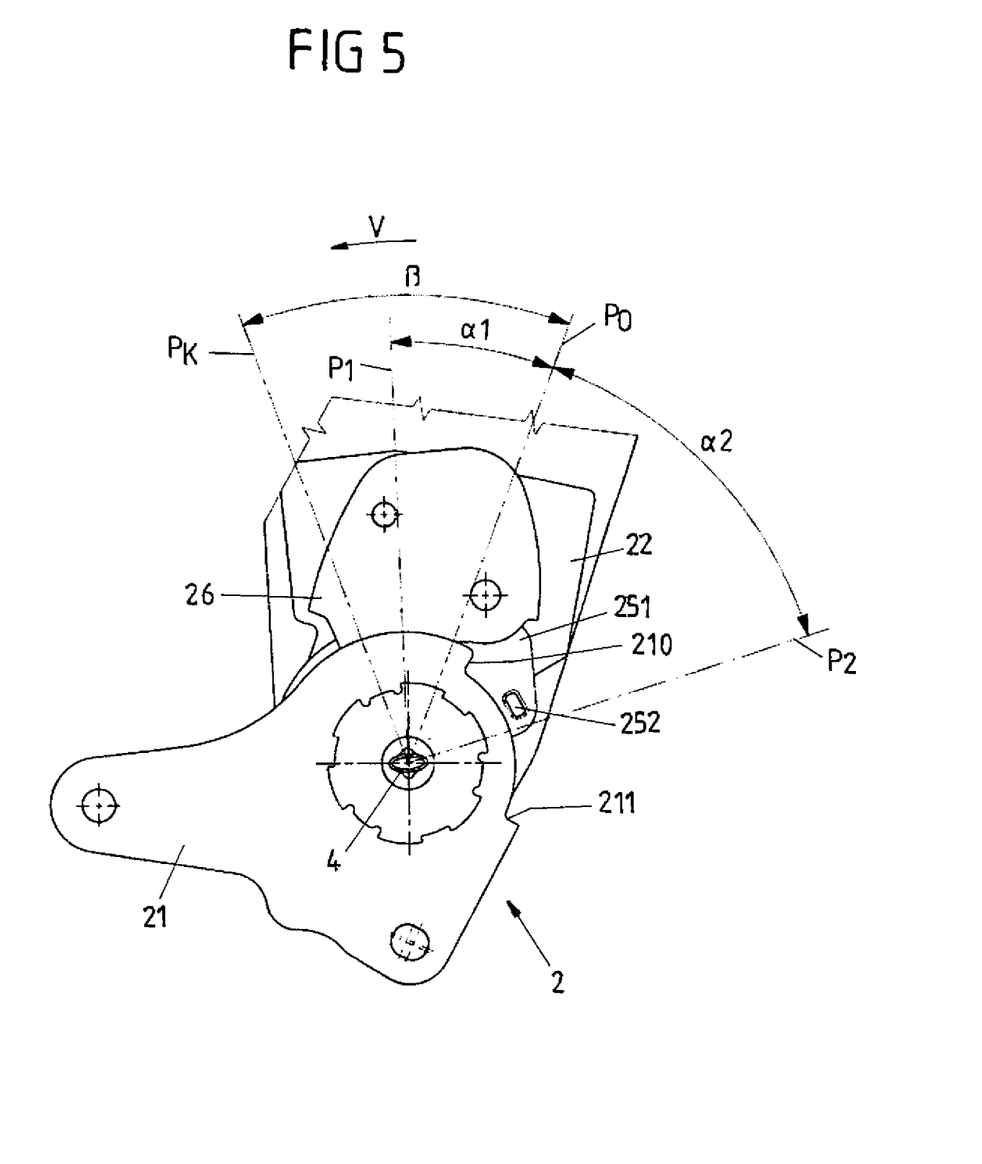
FIG. 5 shows a side view of a fitting, representing the different positions of the backrest.

FIGS. 4 and 5 illustrate possible positions of the backrests 11 in connection with a normal setting of the backrest inclination (positions P0, P1, P2) and in connection with a free-pivoting function (PK), wherein in the views of FIGS. 4 and 5 the locking mechanism is covered by a cover 26. In the position shown in FIG. 4, the backrest 11 is in a position of normal use P0, in which the backrest 11 can be for example when a vehicle occupant is sitting on the vehicle seat 1. The backrest 11 can be moved by actuating the rotary fitting mechanism 25 by means of the electromotive driving device 5 for adjusting the backrest inclination, wherein the backrest 11 can be pivoted between a front backrest position P1 and a rear backrest position P2 along the swivel direction V. The entire swivel angle range of the backrest 11 is determined by the angle α1, by which the backrest 11 can be pivoted forwards, and by the angle α2, by which the backrest 11 can be pivoted rearwards, so that the backrest 11 can electromotively be adjusted in its tilt position in a total angle range α1+α2.

When the locking mechanism in the form of the pawl 24 is actuated for providing the free-pivoting function, the backrest 11 can be folded forwards in swivel direction V from each position between the front backrest position P1 and the rear backrest position P2 into a folded position PK. From the position of normal use P0, the backrest 11 can be folded forwards by an angle β. The maximum swivel angle of the backrest 11 in connection with the free-pivoting function is α2+β, corresponding to folding forwards from the rear position P2. The maximum possible swivel angle α2+β for example can be in the order of 90°.

When the backrest 11 is swiveled forwards in connection with the free-pivoting function, the backrest-side fitting part 251, as described above, will also be moved at least by a small angle. When at the beginning of forward-pivoting in connection with the free-pivoting function, the backrest 11 just is in the front backrest position P1 and the stop 252 at the backrest-side fitting part 251 thus is approached to front stop 210 at the seat-part-mounted fitting adapter 21, this can lead to the fact that due to the movement of the backrest-side fitting part 251 the stop 252 runs up onto the stop 210, which can lead to a distortion inside the rotary fitting mechanism 25 and possibly to a destruction of components of the fitting 2 (it should be taken into account here that on pivoting in connection with the free-pivoting function the backrest 11 provides a long lever arm, by which swivel forces exerted on the backrest 11 are transmitted to the rotary fitting mechanism 25 in a manner strongly geared up).

To exclude such running up of the stops 252, 210 onto each other on forward-pivoting of the backrest in connection with the free-pivoting function, it is provided in the sense of the present invention that at the beginning of a forward-pivoting movement of the backrest 11 in connection with the free-pivoting function or already when actuating the operating handle 3 for unlocking the pawl 24, the driving device 5 actuates the rotary fitting mechanism 25 via the shaft 4 such that the backrest-side fitting part 251 is moved by a predetermined angle γ (see FIG. 6) against the swivel direction V, in order to remove the stop 252 from the stop 210. When this predetermined angle γ is greater than the angle by which the backrest-side fitting part 251 can be moved out of the front backrest position P1 on forward-pivoting of the backrest 11 in connection with the free-pivoting function, it can thus safely be excluded that the stop 252 will run up onto the stop 210 on forward-pivoting of the backrest 11.

Figure 6:
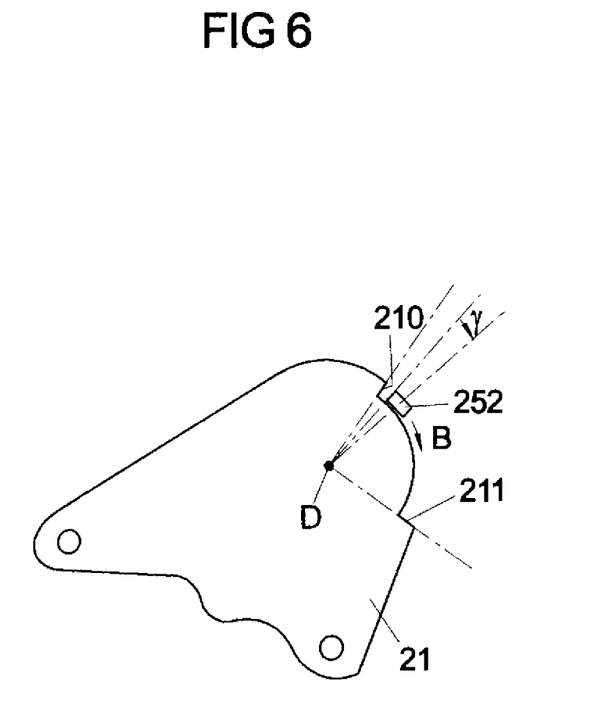
FIG. 6 shows a detail view of a backrest-side fitting in relation to two seat-part-side stops for limiting the swivel path of a backrest-side fitting part relative to a seat-part-side fitting part.

For this purpose, the shaft 4 is moved in the direction A (see FIG. 3) against the swivel direction V, and the backrest-side fitting part 251 correspondingly is shifted in the direction B (see FIGS. 2 and 6).

The predetermined angle γ advantageously corresponds to an angle for which applies:

$$\gamma > \delta \cdot \frac{I}{1-I},$$

wherein γ is the predetermined angle, δ is the swivel angle of the backrest 11 on forward-pivoting from the front backrest position P1 into the folded position PK (corresponding to β−α1 in FIG. 4), and I is the reduction ratio of the rotary fitting mechanism 25. In the front backrest position P1 the stops 210, 252 theoretically are in abutment with each other, so that the maximum predetermined angle γ to be preserved is calculated with reference to this front backrest position P1. If the swivel angle β−α1 of the backrest 11 in connection with the free-pivoting function for example is 21° and the reduction ratio is 1:28, the predetermined angle γ is about 0.8°. Upon initiation of the free-pivoting operation, the backrest-side fitting part 251 is moved back against the swivel direction V by this predetermined angle γ.

The control of the driving device 5 in this sense for example is effected via an electronic control unit 6, as is schematically illustrated in FIG. 4.

Moving the backrest-side fitting part 251 by the predetermined angle γ upon initiation of a free-pivoting operation only is required in principle when the risk of the stops 252, 210 running up onto each other exists, i.e. the backrest 11 is in the vicinity of the front backrest position P1, when the free-pivoting operation is initiated. In a vehicle seat of simple construction, in which the position of the backrest 11 is not measured and monitored, it can however be provided that in any case, i.e. with each actuation of the operating handle 3 for initiating a free-pivoting operation, the rotary fitting mechanism 25 is actuated for resetting the backrest-side fitting part 251.

When the vehicle seat 1 includes a tilt detection means 7 (schematically shown in FIG. 4) for measuring the tilt position of the backrest 11, the current position of the backrest 11 can be measured via the tilt detection means 7, and thus is known. In this case, it can be checked upon initiation of a free-pivoting operation, whether moving the backrest-side fitting part 11 back against the swivel direction V is required, in order to prevent the stops 252, 210 from running up onto each other. When it is detected that the stop 252 has a sufficient distance to the stop 210 upon initiation of the free-pivoting operation, it can be omitted to move the backrest-side fitting part 251 by actuating the same via the driving device 5.

Alternatively, the tilt detection means 7 also can be utilized to a priori prevent an excessive approach of the stop 252 to the front stop 210 in connection with a normal backrest tilt adjustment. When in normal use the tilt of the backrest 11 is adjusted by actuating the rotary fitting mechanism 25 between the front position P1 and the rear position P2 via the electromotive driving device 5, the driving device 5 can be stopped in good time when pivoting the backrest 11 in direction of the front position P1, when the stop 252 is approached to the stop 210, so that a sufficient angular distance is left between the stop 252 and the stop 210, so that on forward-pivoting of the backrest 11 in connection with a free-pivoting function running up of the stops 252, 210 is safely and reliably prevented.

This is only possible, however, when the position of the backrest 11 can reliably be detected via the tilt detection means 7. When the tilt detection means 7, which can be realized for example by Hall sensors or an angle measuring disk, is denormalized, however, and the current backrest position thus cannot be determined reliably, reliable stopping of the driving device 5 when the stop 252 approaches the stop 210 is not possible either. In this case, i.e. when the position of the backrest 11 is not known at the moment, it can then be provided to swivel back the backrest-side fitting part 251 against the swivel direction V by the predetermined angle γ with each actuation of the locking mechanism in the form of the pawl 24 for providing a free-pivoting function, so as to definitely prevent the stops 252, 210 from running up onto each other.

When the backrest 11 is in its folded position PK in connection with the free-pivoting function, an actuation of the rotary fitting mechanism 25 advantageously is blocked, so that the backrest-side fitting part 251 (beyond the movement provided in the sense of the present invention) cannot be rotated, in order to thereby prevent an approach of the stop 252 to the rear stop 211 on the seat-part-mounted fitting adapter 21. If in the folded position PK the rotary fitting mechanism 25 would be actuated for moving the backrest-side fitting part 251 in direction of the rear stop 211 and the stop 252 would come in abutment with the rear stop 211, further running up of the stop 252 onto the rear stop 211 would occur when erecting the backrest 11 from the folded position PK and hence the fitting 2 would be distorted—with the risk of a damage or destruction of the fitting 2—or erecting the backrest 11 would be impeded.

When the backrest 11 again is erected from its folded position PK, it can be provided that the driving device 5 actuates the rotary fitting mechanism 25 such that the backrest-side fitting part 251 is reversed by the predetermined angle γ and hence moved back into its starting position. In this way, it can be ensured that with the backrest 11 erected again, the backrest 11 again is in its starting position from which it has been pivoted forwards.

Alternatively, however, it can also be provided not to perform such reversing of the backrest-side fitting part 251. This leads to the fact that when again erecting the backrest 11, its tilt position has been changed by the predetermined angle γ, which with a small angle γ is hardly perceptible for a seat occupant.

The idea underlying the invention is not limited to the exemplary embodiments described above, but can also be realized in completely different embodiments.

By means of the described invention, a distortion of a fitting arrangement reliably is prevented on forward-pivoting of a backrest in connection with a free-pivoting function, without having to provide expensive constructive measures. Rather, the control solely is effected via control measures to be realized electronically, without having to substantially change the construction of a vehicle seat for this purpose. In particular, no additional components, such as rotary encoders or the like, are required.

The invention claimed is:

1. A vehicle seat comprising
a seat part,
a backrest,
a fitting which pivotally connects the backrest with the seat part about a swivel axis, wherein the fitting includes a seat-part-side fitting part firmly connected with the seat part, a backrest-side fitting part coupled with the backrest via a locking mechanism, and a rotary fitting mechanism pivotally connecting the seat-part-side fitting part with the backrest-side fitting part about the swivel axis,
a driving device arranged on the backrest for driving the rotary fitting mechanism, and
at least one seat-part-side stop and at least one backrest-side stop for limiting a swivel path of the seat-part-side fitting part and the backrest-side fitting part relative to each other, the locking mechanism
being movable between a locking position in which the locking mechanism firmly couples the backrest-side fitting part with the backrest, so that the backrest is adjustable in its inclination relative to the seat part by driving the rotary fitting mechanism, and
a free-pivoting position in which the locking mechanism uncouples the backrest-side fitting part from the backrest, so that the backrest can be pivoted into a folded position in a swivel direction about the swivel axis,
wherein the driving device is formed to actuate the rotary fitting mechanism for pivoting the backrest-side fitting part by a predetermined angle opposite to the swivel direction when the locking mechanism is actuated for pivoting the backrest into the folded position.

2. The vehicle seat according to claim 1, wherein the driving device is configured to act on a shaft in order to drive the rotary fitting mechanism by rotating the shaft.

3. The vehicle seat according to claim 2, wherein the driving device is coupled with the shaft via a self-locking transmission.

4. The vehicle seat according to claim 1, wherein the locking mechanism is formed by a pawl stationarily arranged relative to the backrest, which in the locking position is in locking engagement with the backrest-side fitting part, whereas in the free-pivoting position it is not in engagement with the backrest-side fitting part.

5. The vehicle seat according to claim 1, wherein the driving device is formed to actuate the rotary fitting mechanism by the predetermined angle in the swivel direction when the backrest is erected from its folded position opposite to the swivel direction.

6. The vehicle seat according to claim 1, wherein an actuation of the rotary fitting mechanism is blocked when the backrest is in the folded position.

7. The vehicle seat according to claim 1, wherein the rotary fitting mechanism is formed by a reduction gear.

8. The vehicle seat according to claim 1, wherein the rotary fitting mechanism is formed by a wobble gear or a planetary gear.

9. The vehicle seat according to claim 1, wherein the following applies for the predetermined angle ($\gamma$):

$$\gamma > \delta \cdot \frac{I}{1-I},$$

wherein $\gamma$ is the predetermined angle, $\delta$ is the swivel angle of the backrest on pivoting from a front backrest position into the folded position, and I is a reduction ratio of the rotary fitting mechanism.

10. The vehicle seat according to claim 1, further comprising a tilt detection means for detecting the tilt position of the backrest, wherein the driving device is formed to
- actuate the rotary fitting mechanism with known tilt position of the backrest such that the rotary fitting mechanism is stopped at a tilt setting before the at least one backrest-side stop is spaced from the at least one seat-part-side stop by less than the predetermined angle, and
- only when the tilt position of the backrest is not known, actuate the rotary fitting mechanism for pivoting the backrest-side fitting part by the predetermined angle opposite to the swivel direction, when the locking mechanism is actuated for pivoting the backrest into the folded position.

* * * * *